United States Patent [19]

Elsässer

[11] Patent Number: 5,300,849
[45] Date of Patent: Apr. 5, 1994

[54] DEVICE FOR ELIMINATING THE AXIAL AND RADIAL PLAY OF AN AXLE

[75] Inventor: Axel Elsässer, VS-Villingen-Schwenningen, Fed. Rep. of Germany

[73] Assignee: Deutsche Thomson-Brandt GmbH, Villigen-Schwenningen, Fed. Rep. of Germany

[21] Appl. No.: 927,229

[22] Filed: Aug. 11, 1992

Related U.S. Application Data

[63] Continuation of PCT/EP91/00037, Jan. 11, 1991.

[30] Foreign Application Priority Data

Jan. 18, 1990 [DE] Fed. Rep. of Germany ....... 4001257

[51] Int. Cl.$^5$ .............................................. H02K 7/09
[52] U.S. Cl. .................................. 310/90.5; 369/269
[58] Field of Search ............... 310/90.5; 384/517, 520, 384/563; 369/269, 279, 271

[56] References Cited

U.S. PATENT DOCUMENTS 4,730,299  3/1988  Yasuhiko et al. ................... 369/264
4,935,654  6/1990  Glass et al. ........................ 310/90.5

FOREIGN PATENT DOCUMENTS 3528121  8/1985  Fed. Rep. of Germany .
2180413  3/1987  United Kingdom .

OTHER PUBLICATIONS

Patent Abstract of Japan 56-77951 Sep. 1981.
Patent Abstract of Japan 56-77952 Sep. 1981.
Patent Abstract of Japan 56-77953 Sep. 1981.
IBM Technical Disclosure Bulletin, vol. 30, No. 8, Jan. 1988.

Primary Examiner—Steven L. Stephan
Assistant Examiner—Judson H. Jones
Attorney, Agent, or Firm—J. S. Tripoli; E. P. Herrmann; Hallacher L. L.

[57] ABSTRACT

A device for eliminating the radial and axial play of a shaft having a circular ferromagnetic plate mounted thereon and which passes through a ferromagnetic stationary fitting. The device also includes a permanent magnet for establishing attractive forces within the device. A ferromagnetic arcuate part has a radius of curvature slightly larger than the radius of curvature of the circular ferromagnetic plate. The arcuate part is arranged in the proximity of the edge of the circular ferromagnetic plate whereby a first magnetic force acts between the arcuate part and the edge of the plate to eliminate the radial play and a second magnetic force acts between the shaft and the plate to eliminate the axial play.

3 Claims, 2 Drawing Sheets

DEVICE FOR ELIMINATING THE AXIAL AND RADIAL PLAY OF AN AXLE

This is a continuation of PCT application PCT/EP 91/00037 filed Jan. 11, 1991 by Axel Elsasser and titled "Device for Eliminating the Axial and Radial Play of an Axle".

This invention is directed to a device for eliminating the axial and radial play of a rotating axle (shaft). The shaft projects through a stationary fitted part and a support plate is mounted on the shaft. The plate and the fitted part are made of ferromagnetic materials to create a magnetic force between the two parts.

Electric motors, which are used with such devices as compact disc players, sometimes eliminate the axial play of the motor shaft by using a magnetic coupling force which acts in the axial direction. The magnetic coupling force is attained by means of a disc-type magnet, which is positioned on the motor shaft, and a ferromagnetic flange, which is arranged in a fixed position, It is also possible to provide a ferromagnetic disc on the motor shaft and to attach the magnet to the motor housing. A stronger magnetic attractive force can be created by mounting a magnet on both the motor shaft and the housing.

In addition to the axial play, the motor shaft also is subjected to play in the radial direction. This radial play must also be eliminated. It is a common expedient to suppress the radial play by use of a leg spring. The combination of the two solutions, eliminating the axial play using a magnetic force and the radial play using a leg spring, is disadvantageous because both a magnet and a spring are needed. The spring is subject to wear, causes additional friction and can, under unfavorable conditions, even lead to jamming of the motor shaft. Also, the effort required to mount the magnet, and especially the leg spring, is relatively high.

U.S. Pat. No. 4,730,200 describes a disc drive in which the disc is supported on a turntable which is fitted to the motor shaft. The shaft is mounted on a plate upon which a ring magnet is arranged, and the shaft projects through the center hole of the magnet. The ring magnet is surrounded by a ring-shaped yoke. The disc turntable is mounted on the shaft. A plate is arranged on the underside of the turntable which faces the ring magnet. The plate matches the cross-section of the ring magnet. A magnetic force acts in the axial direction between the ring magnet and the plate, thereby reducing the axial play. Another magnetic force also acts in a radial direction between the plate and the ring magnet, thereby reducing the radial play. Also, a force of attraction acts on the plate radially opposite a first side of the yoke, but in exactly the opposite direction from that of the other radial force. In fact, the magnetic force which radiates from the first side of the yoke to the plate is, as a result of the asymmetry, greater than the force of the attraction between the second side of the yoke and the plate. This is because the distance between the first side of the yoke and the plate is smaller than the distance between the second side of the yoke and the plate. Accordingly, if, as a result of an external impact, the disc turntable is deflected toward the second side of the yoke, the distance between the plate and the first side of the yoke increases, while the distance between the plate and the second side of the yoke decreases. As a consequence, the magnetic restoring force between the first side of the yoke and the plate diminishes, while the force between the plate and the second side of the yoke increases. Thus, the force acting in the direction of the deflection force is undesirably increased. Therefore, the restoring force diminishes and the deflecting force increases and the radial play is increased rather than reduced, as is desired.

It is an object of the inventing to eliminate shaft play in the axial direction using a magnetic coupling force, and to eliminate radial play using the simplest means possible and which is also effective when the motor is subjected to external impact. With the invention, an arcuate part has a radius of curvature slightly greater than that of the plate. The arcuate part is arranged on the fitted part. The arcuate part is disposed adjacent to the edge of the plate on the fitted part and is on the same level as the edge of the plate. A magnetic force, which is radial to the motor shaft, thus acts between the arcuate part and the plate.

Figure 1:
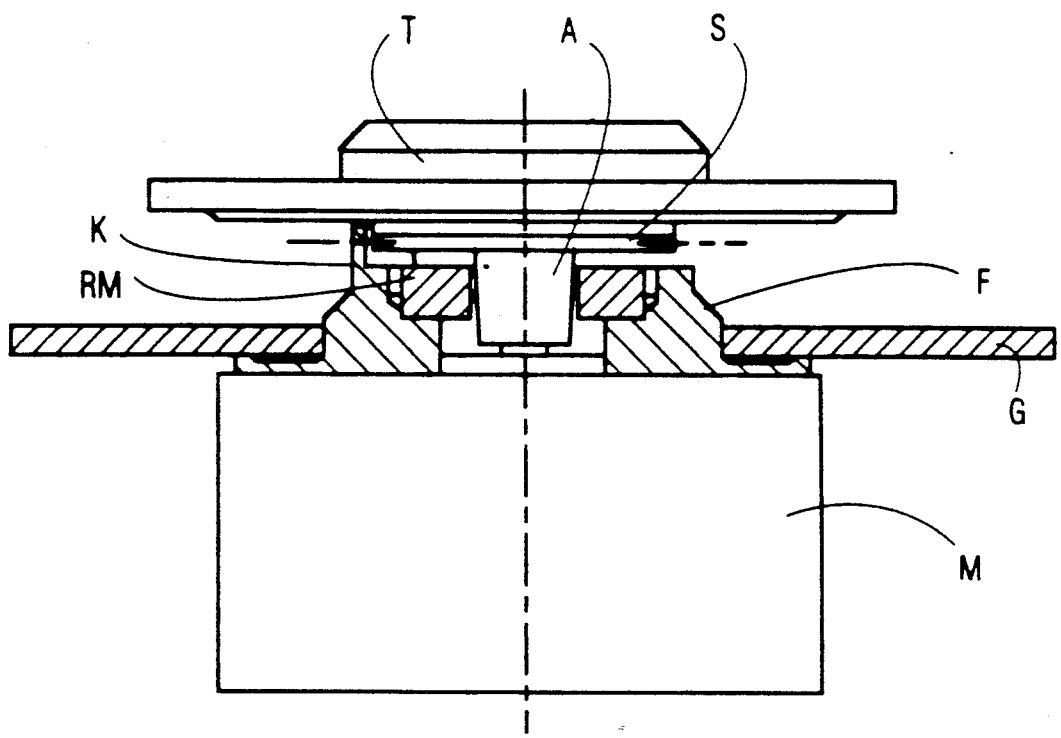
FIG. 1 is a side view of a preferred embodiment.
Figure 2:
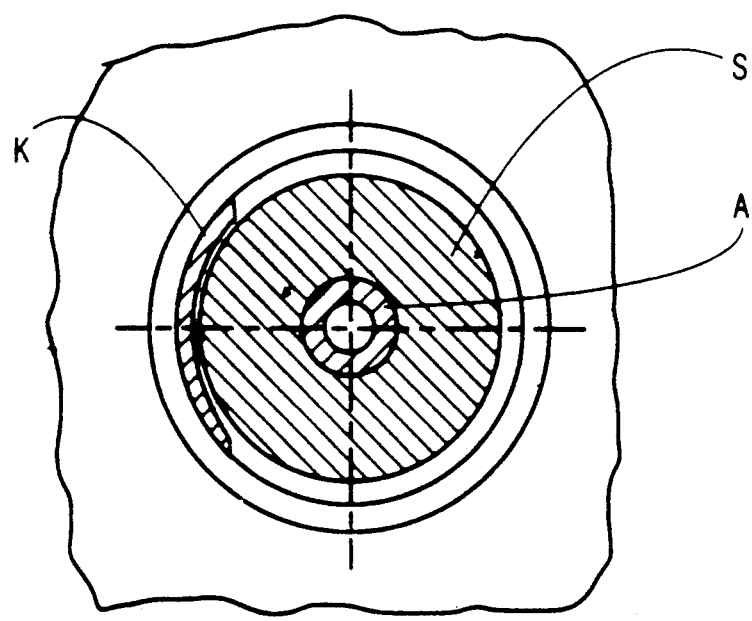
FIG. 2 is a plan view of the preferred embodiment of FIG. 1.

In FIGS. 1 and 2, a motor M, which drives the disc of a CD player, is attached to a ferromagnetic flange F. The flange F is mounted on a housing G. A ring magnet RM is arranged in flange F and the motor shaft A projects through a centered aperture in the ring magnet RM, but doe snot touch it. A ferromagnetic plate S is mounted on the motor shaft A and the support plate T, which supports a DC disc during normal operation is arranged above the plate S. An arcuate part K is provided on flange F at the same level as, and adjacent to, the edge of plate S.

A magnetic force of attraction acts in an axial direction between the ring magnet RM and the plate S to eliminate the axial play of the motor shaft A. Also, a magnetic force of attraction acts in a radial direction between the arcuate part K and the plate S to eliminate the radial play of the motor shaft A. Accordingly, both the axial and radial play are eliminated without the use of a spring or additional magnets. It is also possible to provide a ring magnet on the motor axle instead of the plate.

The invention is particularly advantageous, simple and inexpensive to produce because the same components effective in the elimination of the axial play, i.e. the plate S, the ring magnet RM and the flange F, the also effective in the elimination of radial play, through the simple measure of providing an arcuate part K.

FIG. 2 shows the disposition of the curved part K relative to the plate S and the motor shaft A.

Figure 3:
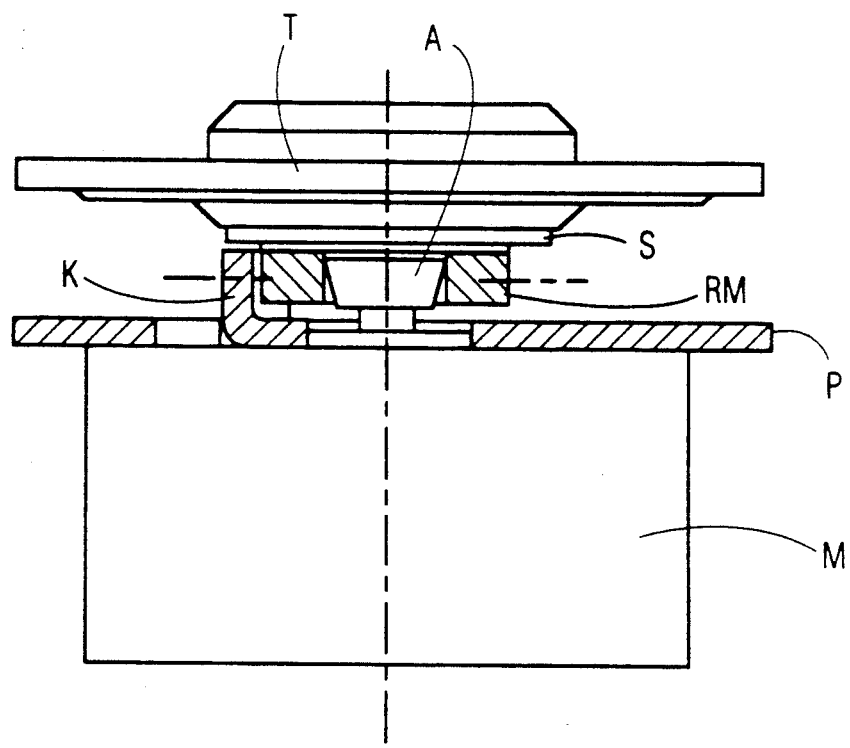
FIG. 3 is a side view of a second preferred embodiment.
Figure 4:
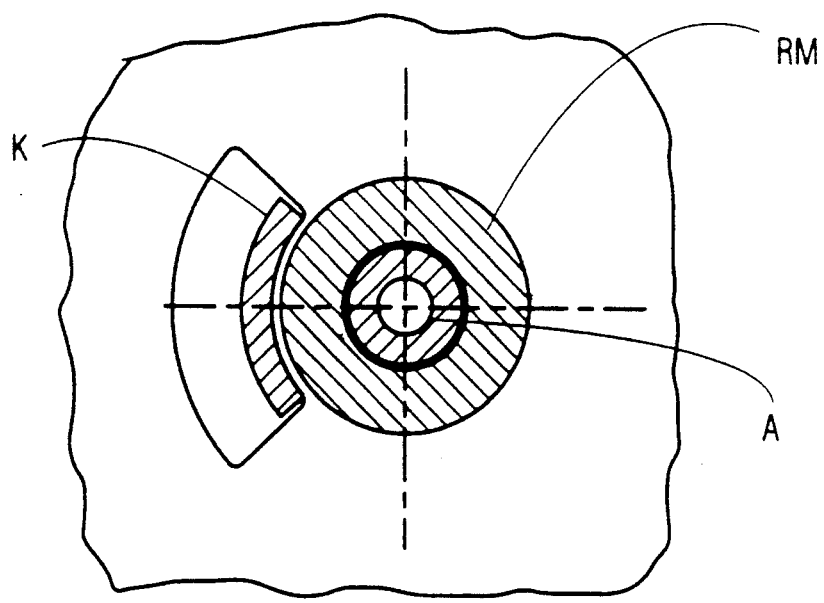
FIG. 4 is a plan view of the preferred embodiment of FIG. 3.

In FIGS. 3 and 4, the motor M of the disc drive for a CD player is affixed to a metal plate P. A ring magnet RM is mounted on the motor shaft A and the support plate T for the disc is arranged above the ring magnet RM. A ferromagnetic arcuate part K is disposed on the metal plate P in the proximity of the plate S. The arcuate part K can be stamped out of the metal plate P. As the magnetic force of attraction acts between the ring magnet MR, which is mounted on the motor shaft A, and the metal plate P, to which the motor M is affixed, the axial play of the motor shaft A is eliminated. The ferromagnetic arcuate part K is located adjacent to the ring magnet RM and therefore a magnetic force of attraction also acts in a radial direction and the radial play of the motor shaft A is also eliminated. Also, as is the case of the FIG. 1 embodiment, the components used to eliminate the axial play of the motor shaft A, i.e. the ring magnet RM and the metal plate P are also effective in eliminating the radial play of the shaft A. Accordingly, through the simple measure of stamping the arcuate part K into the ferromagnetic metal plate P such that the arcuate part K is located adjacent to the ring magnet RM, both the axial play and the radial play of motor shaft A are eliminated.

The invention is suitable for eliminating the axial and radial play of an axle or shaft. The invention can be particularly advantageously used to eliminate the radial and axial play in the shaft of a motor for the disc drive of a recording and/or playback device such as, for example, CD players, video disc players, DRAW disc players and magneto-optical devices.

I claim:

1. In a device for eliminating the radial and axial play of a shaft having a circular ferromagnetic plate mounted thereon and which passes through a ferromagnetic stationary fitting, said device also having a permanent magnet for establishing attractive forces in said device an improvement comprising:

a ferromagnetic arcuate part having a radius of curvature slightly larger than the radius of curvature of said circular ferromagnetic plate, said arcuate part being arranged in the proximity of the edge of said circular ferromagnetic plate whereby a first magnetic force acts between said arcuate part and the edge of said plate to eliminate said radial play and a second magnetic force acts between said shaft and said plate to eliminate said axial play.

2. The improvement of claim 1 wherein said permanent magnet is a ring magnet and wherein said stationary fitting is a flange arranged coaxial with said shaft for supporting said magnet and wherein said arcuate part is integral with said flange.

3. In a device for eliminating the radial and axial play of a shaft having a first ferromagnetic plate mounted thereon, An improvement comprising:

a permanent magnet arranged coaxial with said shaft, a second ferromagnetic plate having an aperature for receiving said shaft, said second plate including an arcuate part having a radius of curvature slightly larger than the radius of curvature of said permanent magnet and arranged in the proximity of said magnet whereby a first magnetic force acts between said arcuate part and said magnet to eliminate said radial play and a second magnetic force acts between said magnet and said first plate to eliminate said axial play.

* * * * *